US008817121B2

(12) United States Patent
Narabu

(10) Patent No.: US 8,817,121 B2
(45) Date of Patent: Aug. 26, 2014

(54) IMAGE APPARATUS AND IMAGING METHOD

(75) Inventor: Tadakuni Narabu, Kanagawa (JP)

(73) Assignee: Sony Corporation, Tokyo (JP)

( * ) Notice: Subject to any disclaimer, the term of this patent is extended or adjusted under 35 U.S.C. 154(b) by 243 days.

(21) Appl. No.: 12/926,182

(22) Filed: Oct. 29, 2010

(65) Prior Publication Data

US 2011/0149100 A1 Jun. 23, 2011

(30) Foreign Application Priority Data

Dec. 18, 2009 (JP) .................................. 2009-288230

(51) Int. Cl.
*H04N 5/235* (2006.01)

(52) U.S. Cl.
USPC .................................. 348/222.1; 348/231.99

(58) Field of Classification Search
USPC .................. 348/222.1, 340, 207.99; 250/208; 345/156
See application file for complete search history.

(56) References Cited

U.S. PATENT DOCUMENTS

| 2005/0046944 | A1* | 3/2005 | Shenderova et al. ........... 359/565 |
| 2006/0157640 | A1* | 7/2006 | Perlman et al. ............ 250/208.1 |
| 2007/0177040 | A1 | 8/2007 | Narabu |
| 2008/0037860 | A1* | 2/2008 | Yamashita .................... 382/149 |
| 2008/0187305 | A1* | 8/2008 | Raskar et al. ................. 396/268 |
| 2010/0094626 | A1* | 4/2010 | Li et al. .......................... 704/234 |

FOREIGN PATENT DOCUMENTS

JP 2006-087088 3/2006

OTHER PUBLICATIONS

Extended European Search Report issued Apr. 14, 2011 for corresponding European Patent Application No. 10 19 4561.
Liang, Chia-Kai, et al. "Programmable Aperture Photography: Multiplexed Light Field Acquisition". ACM Transactions on Graphics ACM USA, vol. 27, No. 3, Article 55, Aug. 2008. XP002628313, ISSN: 0730-0301.
Shogenji, R., et al. "Multispectral Imaging System by Compact Compound Optics", Proceedings of the SPIE—The International Society for Optical Engineering SPIE-INT/ Soc. Opt. Eng, USA, vol. 5225, No. 1, 2003, pp. 93-100, XP002628314, ISSN; 0277-786X.
Fife, Keith, et al. "A 3D Multi-Aperture Image Sensor Architecture", Conference 2006, IEEE Custom Integrated Circuits, IEEE, Piscataway, NJ, USA, Sep. 1, 2006, pp. 281-284, XP031052471, ISBN: 978-1-4244-0075-1.
Narabu, Tadakuni "A Novel Image-Acquisition System Using the Optical-Multiple.X System", IS&T/SPIE Annual Symposium Electric Imaging Science and Technology, Proceedings of SPIE Electric Imaging, vol. 6501, Feb. 21, 2007, XP002628315.
Homsey, R., at el. "Electronic Compound-Eye Image Sensor: Construction and Calibration", Proceedings of the SPIE—The International Society for Optical Engineering SPIE-Int. Soc. Opt. Eng, USA, vol. 5301, No. 1, 2004, pp. 13-24, XP002628316, ISSN: 0277-786X.
Kitamura, Y., et al. "Reconstruction of a High-Resolution Image on a Compound-Eye Image-Capturing System", Applied Optics Opt. Soc. America USA, vol. 43, No. 8, Mar. 10, 2004, pp. 1719-1727, XP002628317, ISSN: 0003-6935.

* cited by examiner

*Primary Examiner* — Joel Fosselman
(74) *Attorney, Agent, or Firm* — Rader, Fishman & Grauer PLLC

(57) ABSTRACT

An imaging apparatus includes: an image sensor in which plural pixels having a photoelectric conversion function are arranged; a light guiding unit including plural optical system windows that guide light from an object to the respective pixels of the image sensor; and a signal processing unit that performs signal processing based on imaging information of the image sensor, wherein the signal processing unit obtains distance information of the object based on the imaging information of the image sensor and generates an image in response to a distance of the object based on the distance information.

21 Claims, 17 Drawing Sheets

DISTANCE BETWEEN OBJECT AND APERTURE SHEET:
ROMAN STATURE, APPROXIMATED AT POINT OF INFINITY (6.4 cm OR MORE)
NUMERAL NO.CARD:5.4mm

PIXEL PITCH:10 μm
DISTANCE BETWEEN WINDOWS ON APERTURE SHEET (LENS OR PIN HOLE):270 μm
DISTANCE BETWEEN PHOTOELECTRIC CONVERSION PART SURFACE AND APERTURE SHEET:200 μm

IMAGE APPARATUS AND IMAGING METHOD

BACKGROUND OF THE INVENTION

1. Field of the Invention

The present invention relates to an imaging apparatus and an imaging method, and specifically, to an imaging apparatus having an optical-multiplex system using an image sensor that photoelectrically converts light from an object and an imaging method therefor.

2. Description of Related Art

As imaging apparatus, a pinhole camera that performs imaging by guiding light from an object through a hole called a pinhole pierced on one surface of a dark box onto a photoreceptor such as a film within the dark box is widely known.

In the case of the pinhole camera, the light reaching one point of the photoreceptor is only a little light that has passed through the pinhole.

Therefore, the amount of light is small, and the pinhole camera is impractical especially in consideration of imaging in a dark place.

Accordingly, in a general imaging apparatus, an imaging lens is used and an imaging device is provided in a focal position of the imaging lens.

Further, optical processing is performed on the light from the object introduced by the imaging lens in an optical system for easy conversion into electric signals by the imaging device. Then, the light is guided to the photoelectric conversion side of the imaging device 102, and predetermined signal processing is performed on the electric signals obtained by the photoelectric conversion by the imaging device by a downstream signal processing circuit (for example, Non-Patent Document 1 (Hiroo Takemura, CCD camera gijutsu nyuumon, first edition, CORONA PUBLISHING, August 1998, pp. 2-4)).

Recently, the imaging apparatus of this kind has not only been used singly as a camera system such as a digital still camera or the like but also has been incorporated into a small portable apparatus such as a cellular phone or the like for use.

Accordingly, for incorporation into the cellular phone or the like, currently, a smaller and lighter imaging apparatus at lower cost is strongly desired.

That is, incorporation of the smaller and lighter imaging apparatus at lower cost may greatly contribute to provide a smaller and lighter small portable apparatus of lower cost such as a cellular phone or the like.

However, an imaging apparatus using an imaging lens becomes larger by the size of the imaging lens, heavier by the weight of the imaging lens, and further, becomes expensive due to the cost of the imaging lens.

Further, the light falls off at edges by shading of the imaging lens. Furthermore, for imaging of an object having a wide dynamic range, a large difference in amount of signal charge is produced between pixels of the imaging device, and it is necessary to design the dynamic range of the imaging device wider in consideration of the difference.

In response to the circumferences, Patent Document 1 (JP-A-2006-87088) proposes an optical-multiplex system imaging apparatus that can be made smaller and lighter with lower cost without using an imaging lens and can perform imaging of images without blur using a desired amount of light.

SUMMARY OF THE INVENTION

In the optical-multiplex system imaging apparatus, a technique that can easily realize imaging for which an operation principle and S/N improvement are confirmed by a computer simulation on the assumption of an object located at the point at infinity is confirmed (for example, see Non-Patent Document 2 (Tadakuni Narabu, A novel image-acquisition system using the optical-multiplex system, IS&T/SPIE Annual Symposium Electric Imaging Science and Technology, Proceedings of SPIE Electric Imaging Vols. 6501, January 2007)).

That is, in image formation by the optical-multiplex system, on the assumption of the image formed by adding the translated same images, the operation has been confirmed.

Regarding the optical-multiplex system imaging apparatus, a specific technique of reproducing desired images has not clearly described with respect to the case where an object at a finite distance and an object at the point at infinity are mixed.

Therefore, no processing is performed with respect to information on the distance between the object at the finite distance and the optical-multiplex system imaging apparatus, or no calculation of distance information is considered.

Further, there are two types of imaging apparatuses of so-called active-type and passive-type for which structures and techniques for calculating distance information are disclosed other than the optical-multiplex system imaging apparatus.

In the active-type imaging apparatus, the distance between a camera and an object is calculated by irradiating an object with light of near-infrared light or the like from the camera side and detecting information of the reflected light thereof.

In the passive-type imaging apparatus, the distance between a camera and an object is calculated based only on information of light from the object.

First, on the basis of the principle of triangulation, the active-type imaging apparatus for calculating the distance between a camera and an object by irradiating the object with light of near-infrared light or the like from the camera side and detecting information of the reflected light thereof applies light of near-infrared or the like toward the object from the camera side.

For the passive-type of calculating the distance between a camera and an object based only on information of light from the object, the following imaging apparatus is proposed.

That is, for the passive-type, structures of imaging apparatuses using plural cameras, using a compound-eye imaging unit, using a microlens array, using a specially-processed lens, etc. are proposed.

It is expected that the distance between the imaging apparatus and the object can be calculated by establishing a technique utilizing the structures of image apparatuses.

However, in all of the passive-type apparatuses, only incident light from one optical system enters one pixel of an image sensor used in the imaging apparatus.

In the active-type distance information calculation imaging apparatus, it is necessary to apply light of near-infrared light or the like from the imaging apparatus side toward the object and hardware for light application is necessary, and the apparatus becomes larger and the cost of the apparatus becomes higher.

Further, the distance information may be calculated only with respect to the distance at which the light applied from the camera side reaches the object and the information of the reflected light from the object reaching the camera side may be received.

In the passive-type distance information calculation imaging apparatus, several configurations and techniques have been proposed for an image apparatus, and their problems are as follows.

First, in the apparatus and system of calculating the distance information using plural cameras, plural cameras are necessary, the imaging apparatus becomes larger, and the cost of the apparatus becomes higher.

Further, the characteristics differences among the plural cameras have adverse effects on the image quality and distance accuracy, and the range of variations demanded for the cameras becomes severely restricted. Or, the signal processing for correcting the variations becomes complex. As a result, the cost becomes higher.

In the apparatus and system of calculating the distance information using a compound-eye imaging unit, the number of pixels of the respective independent eyes is not taken larger and acquisition of high-definition images becomes difficult.

In the apparatus and system of calculating the distance information using a microlens array, the number of pixels for calculation of the distance information are assigned to the respective independent eyes, the resolution obtained from the total number of pixels of the image sensor becomes lower.

Further, to raise the accuracy of the distance information, it is necessary to take the aperture of the main lens larger, and the main lens becomes larger and heavier and the cost of the main lens becomes higher. To make the main lens lighter and smaller and suppress the cost, the accuracy of the distance information becomes deteriorated.

In the apparatus and system of calculating the distance information using a specially-processed lens, to raise the accuracy of the distance information, it is necessary to take the aperture of the main lens larger, and the main lens becomes larger and heavier and the cost of the main lens becomes higher.

To make the main lens lighter and smaller and suppress the cost, the accuracy of the distance information becomes deteriorated.

Thus, it is desirable to provide an imaging apparatus that can obtain distance information between an object and the apparatus with high accuracy and obtain images in response to the distance information while suppressing upsizing and cost increase.

An imaging apparatus according to an embodiment of the invention includes an image sensor in which plural pixels having a photoelectric conversion function are arranged, a light guiding unit including plural optical system windows that guide light from an object to the respective pixels of the image sensor, and a signal processing unit that performs signal processing based on imaging information of the image sensor, wherein the signal processing unit obtains distance information of the object based on the imaging information of the image sensor and generates an image in response to a distance of the object based on the distance information.

An imaging method according to another embodiment of the invention includes the steps of the light guiding step of guiding light from an object through plural optical system windows to respective pixels of an image sensor in which plural pixels having a photoelectric conversion function are arranged and the signal processing step of performing signal processing based on imaging information of the image sensor, wherein the signal processing step obtains distance information of the object based on the imaging information of the image sensor and generates an image in response to a distance of the object based on the distance information.

According to the embodiments of the invention, distance information between the object and the apparatus can be obtained with high accuracy and images in response to the distance information can be obtained while upsizing and cost increase are suppressed.

BRIEF DESCRIPTION OF THE DRAWINGS

FIG. 17 shows an object image by a lower optical system in the positional relationship erecting toward both the imaging apparatus and the object.

DESCRIPTION OF PREFERRED EMBODIMENTS

As below, an embodiment of the invention will be explained with reference to the drawings.

The explanation will be made in the following order.
1. Basic Configuration of Optical-multiplex system Imaging Apparatus
2. Outline of Signal Processing
3. Specific Examples of Signal Processing

1. Basic Configuration of Optical-Multiplex System Imaging Apparatus

Figure 1:
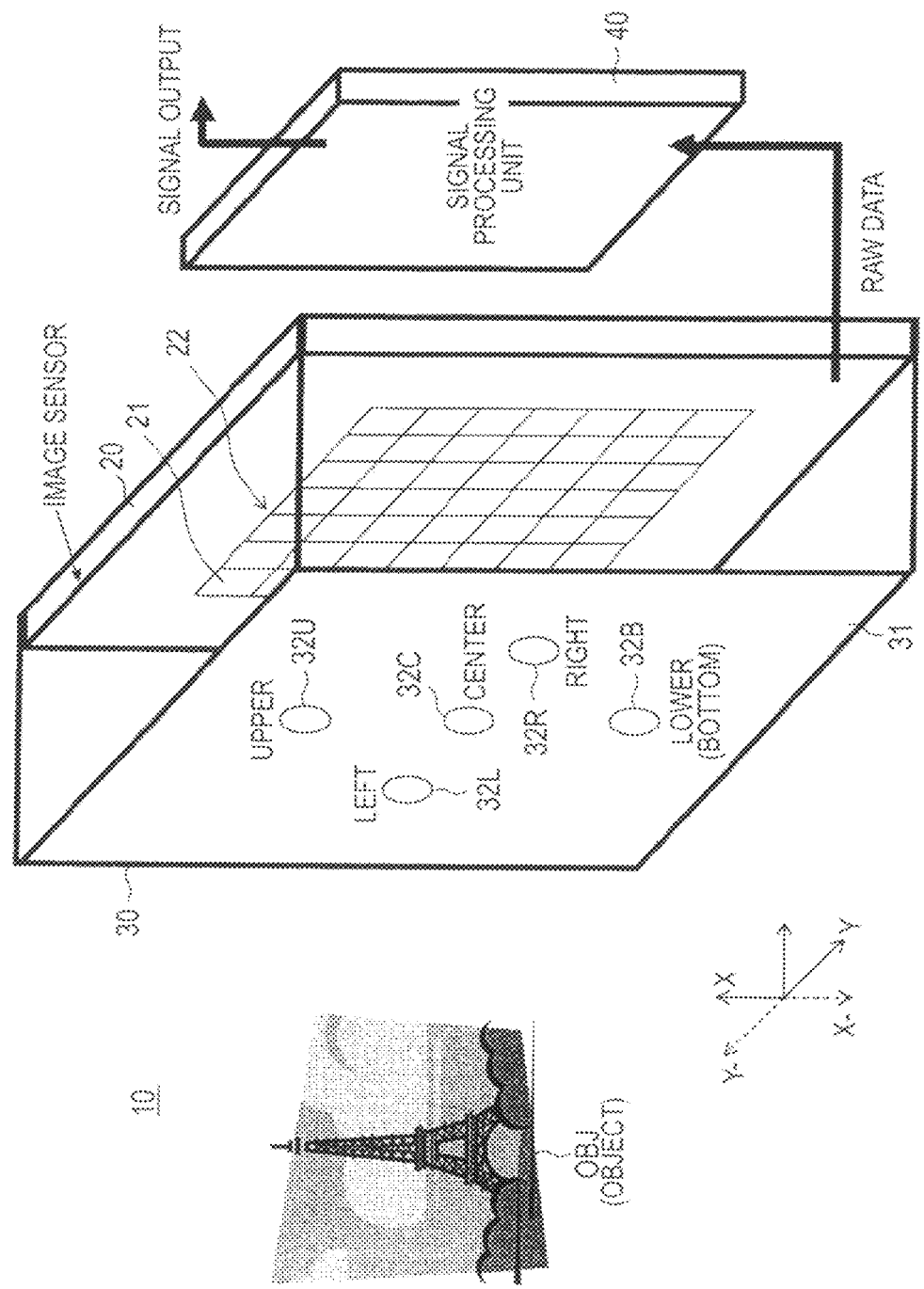
FIG. 1 is a schematic configuration diagram showing a basic configuration of an optical-multiplex system imaging apparatus according to an embodiment of the invention.

FIG. 1 is a schematic configuration diagram showing a basic configuration of an optical-multiplex system imaging apparatus according to an embodiment of the invention.

Figure 2:
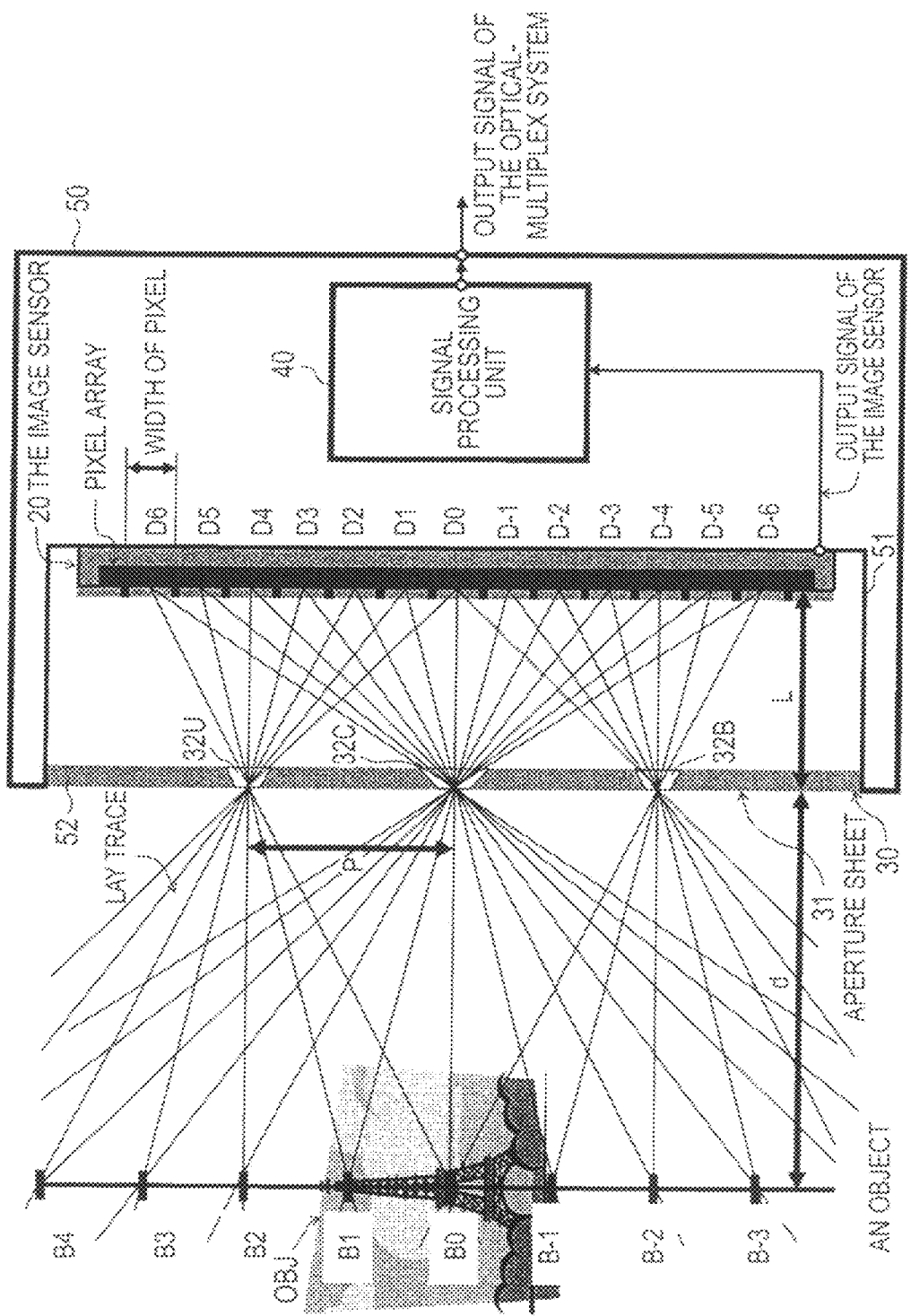
FIG. 2 is a simplified sectional view showing a simulation model of the optical-multiplex system imaging apparatus according to the embodiment of the invention.

FIG. 2 is a simplified sectional view showing a simulation model of the optical-multiplex system imaging apparatus according to the embodiment of the invention.

An optical-multiplex system imaging apparatus 10 according to the embodiment has an image sensor 20 in which plural pixels are arranged in a matrix, a light guiding unit 30 in which plural optical system windows are formed, and a signal processing unit 40 as main component elements.

Here, the optical-multiplex system imaging apparatus 10 refers to imaging apparatus including plural optical systems, the image sensor, and the signal processing system, in which incident light to one pixel of the image sensor is formed by incident light from the plural optical systems.

The optical-multiplex system imaging apparatus 10 according to the embodiment has a function of calculating distance information of an object OBJ in the signal processing unit 40, and has a function of creating a defocused image and a focused image in response to a distance between the object OBJ and itself based on the distance information, as will be described later in detail.

In the case where an object at infinity or approximated at infinity and an object at a finite distance are mixed, the optical-multiplex system imaging apparatus 10 has a function of calculating both object information as images and distance information to the objects from imaging information.

In the imaging apparatus 10, the image sensor 20, the light guiding unit 30, and the signal processing unit 40 as the main component elements are mounted on an apparatus main body 50 with one principal surface opened as shown in FIG. 2.

In the opening part of the apparatus main body 50, for example, a rectangular package 51 is provided. In the package 51, a principal surface opens at the opening part side of the apparatus main body 50 and a light shielding plate 52 is provided in the opening part, and thereby, a dark box is formed.

Within the package 51, the image sensor 20 is provided.

As the image sensor 20, a charge-transfer type image sensor represented by the CCD (Charge Coupled Device) imager, an XY-address type image sensor represented by the MOS (Metal Oxide Semiconductor) imager, or the like may be applied.

That is, in the image sensor 20, plural pixels 21 are arranged in a matrix and light entering through the optical system windows 32 of the light guiding unit 30 is photoelectrically converted into electric signals in response to their amounts of light in units of pixels.

The image sensor 20 has an effective pixel area (a pixel part actually used as imaging information) 22 at the center of the sensor.

The image sensor 20 has an analog front end part including a timing generator and an analog/digital converter (ADC), for example.

In the timing generator, driving timing of the image sensor 20 is generated, and the ADC converts analog signals readout from the pixels into digital signals and outputs them to the signal processing unit 40.

The light guiding unit 30 has an aperture sheet 31 including a function of the light shielding plate 52.

In the aperture sheet 31, plural (five in the example of FIG. 1) optical system windows 32C, 32U, 32B, 32R, 32L are formed.

The optical system window 32C is formed nearly in the center part of the aperture sheet 31.

The optical system window 32U is formed at a predetermined distance relative to the center optical system window 32C in an upper area at the positive side in the X-direction in an orthogonal coordinate system in the drawing.

The optical system window 32B is formed at a predetermined distance relative to the center optical system window 32C in a lower area at the negative side in the X-direction in the orthogonal coordinate system in the drawing.

The optical system window 32R is formed at a predetermined distance relative to the center optical system window 32C in a right area at the positive side in the Y-direction in an orthogonal coordinate system in the drawing.

The optical system window 32L is formed at a predetermined distance relative to the center optical system window 32C in a left area at the negative side in the Y-direction in the orthogonal coordinate system in the drawing.

The optical system windows 32C, 32U, 32B, 32R, 32L are formed as pinholes, for example. Lenses may be provided therein.

Basically, plural optical system windows may be provided and incident light to one pixel 21 of the image sensor 20 may be formed by incident light from the plural optical systems. Therefore, the number of optical system windows is not limited to five as in the embodiment.

When the optical system windows 32C, 32U, 32B, 32R, 32L are formed as pinholes, their shapes are hole shapes having minute diameters.

The optical system windows 32C, 32U, 32B, 32R, 32L of the embodiment have hole shapes having minute diameters, and formed so that the diameters gradually become larger from the object OBJ side surface (front surface) toward the surface (rear surface) facing the image sensor 20.

Further, in the center optical system window 32C, its diameter is set larger than the diameters of the surrounding optical system windows 32U, 32B, 32R, 32L so that the larger amount of light may be obtained.

The light from the object OBJ passes through the respective plural optical system windows 32C, 32U, 32B, 32R, 32L, and forms images in the number of the optical system windows as information of the object on an imaging surface of the image sensor 20 by the pinhole effect.

Thereby, on the entire imaging surface, the amount of light in response to the number of the formed images of the object, i.e., the number of the optical system windows 32 is obtained.

As disclosed in Patent Document 1 by the same inventor, the configurations of the optical system windows may be selected according to the purpose, but not limited to those in the embodiment.

The number and shape of the optical system windows 32 are as follows.

The size of the optical system window formation area on the light shielding plate 52 in which the optical system windows 32 are formed may be larger than the size of the effective pixel part 22 of the image sensor 20 for allowing energy of light substantially equal to that of the pixels in the center part to enter the pixels in the peripheral part of the effective pixel part 22 of the image sensor 20.

For example, it is preferable that the size of the optical system window formation area is about nine times that of the effective pixel part 22 in area.

Note that the size of the hole formation area on the light shielding plate 52 relative to the size of the effective pixel part 22 of the image sensor 20 also depends on a relation between a distance L between the light shielding plate 52 and the imaging surface of the image sensor 20 and an angle of view of the image sensor 20.

For example, in the case where the image sensor has the effective pixel part 22 of 3 mm (horizontal)×3 mm (vertical) and L=3 mm, when the angle of view is set to 90 degrees, the hole formation area on the light shielding plate 52 is set to nine times that of the effective pixel part 22 in area. Thereby, the energy of light entering all pixels of the effective pixel part 22 may be made nearly uniform.

As described above, images of information of the object OBJ are formed on the imaging surface of the image sensor 20 through the respective plural optical system windows 32, and the energy of light in response to the number of optical system windows 32 may be obtained on the entire imaging surface.

Accordingly, a necessary amount of light may be obtained by appropriately setting the number of optical system windows 32.

Note that, on the imaging surface, images of the respective pieces of object information are shifted by the amount of shifts in response to the pitch of the optical system windows 32.

The shifts between the images of the respective pieces of object information formed on the imaging surface are corrected by signal processing in the signal processing unit 40. The details of the signal processing will be described later.

The image sensor 20 photoelectrically converts the images of the information of the object OBJ formed on the imaging surface in units of pixels and outputs them as electric signals.

At the downstream of the image sensor 20, the signal processing unit 40 is connected.

<2. Outline of Signal Processing>

The signal processing unit 40 performs desired signal processing on the electric signals output from the image sensor 20 based on the respective information of the object guided to the light receiving surface of the image sensor 20 through the respective plural optical system windows 32C, 32U, 32B, 32R, 32L.

The signal processing unit 40 has a function of calculating distance information of the object OBJ, and has a function of creating an defocused image and a focused image in response to the distance between the object OBJ and itself based on the distance information.

In the case where an object at infinity or approximated at infinity and an object at a finite distance are mixed, the optical-multiplex system imaging apparatus 10 has a function of calculating both object information IFOBJ as images and distance information z to the objects from imaging information IFIMG.

As below, the signal processing of the signal processing unit 40 will be explained.

In the following explanation, the optical system windows will simply be referred to as "optical systems".

In the case where an object at infinity or approximated at infinity and an object at a finite distance are mixed, as methods of calculating both object information IFOBJ as images and distance information z to the objects from imaging information IFIMG, the following methods may be employed.

First, there are classification methods using a technique of obtaining a matrix. There are two kinds of methods.

Second, there are classification methods using the number of pieces of imaging information by an optical-multiplex system. There are three kinds of methods.

[Classification Using Technique of Obtaining Matrix]

In this case, for example, a method of selecting elements of a matrix according to correlations based on positions of the respective optical systems of the optical-multiplex system with respect to pixels and a pixel area may be employed.

Alternatively, a method of preparing plural matrices in response to distances in advance and selecting elements of a matrix according to correlations between calculated images using them and a reference image may be employed.

[Classification Using Number of Pieces of Imaging Information by Optical-Multiplex System]

In this case, a method of obtaining the information from only one piece of imaging information by the optical-multiplex system imaging apparatus 10 may be employed, for example.

Or, a method of obtaining the information by acquiring imaging information by the center optical system forming the optical-multiplex system in addition to the imaging information by the optical-multiplex system may be employed.

Or, a method of obtaining the information by acquiring independent imaging information by the plural optical systems forming the optical-multiplex system in addition to the imaging information by the optical-multiplex system may be employed.

In this case, the imaging information by the center optical system is employed as reference information.

Alternatively, the plural pieces of imaging information by the optical-multiplex system are employed as reference information.

Figure 3:
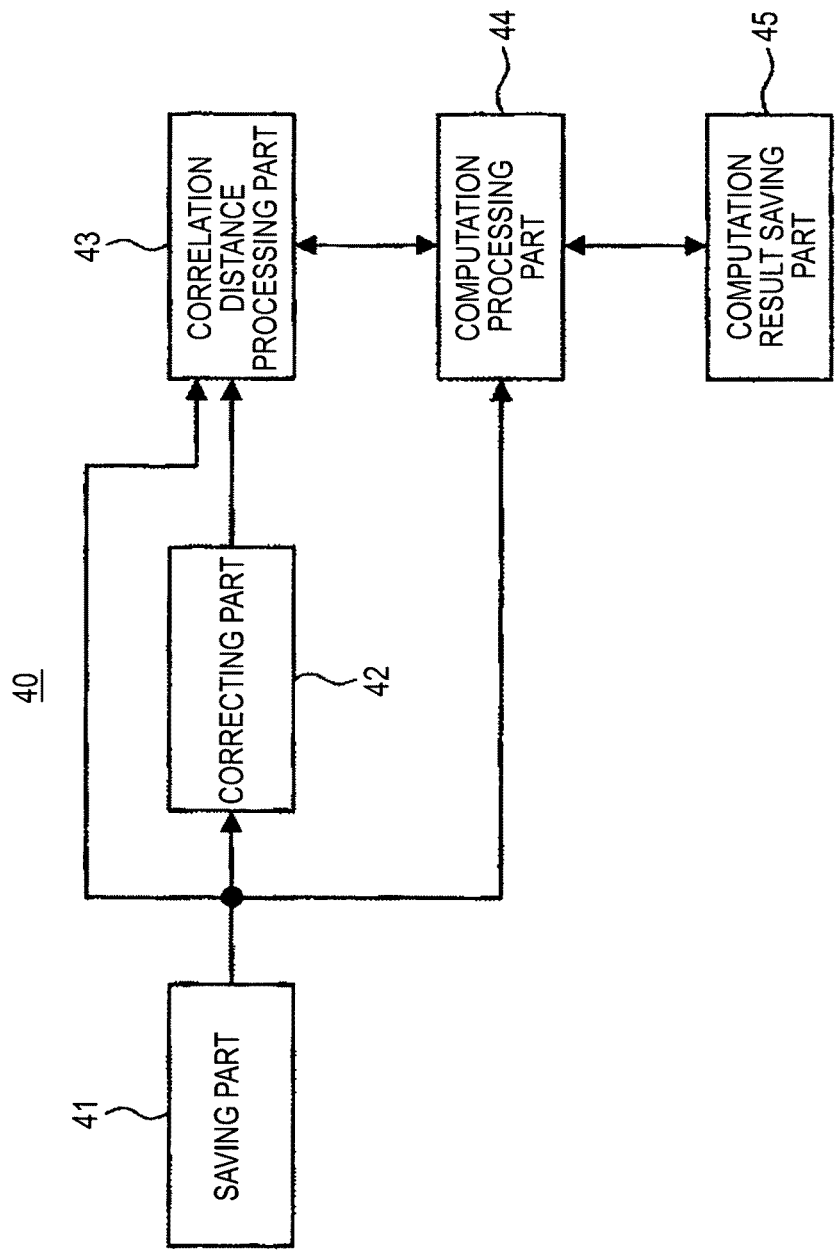
FIG. 3 shows main functional blocks in a signal processing unit according to the embodiment.

FIG. 3 shows main functional blocks in the signal processing unit according to the embodiment.

The signal processing unit 40 in FIG. 3 includes a saving part 41, a correcting part 42, a correlation distance processing part 43, a computation processing part 44, and a computation result saving part 45.

The saving part 41 saves two-dimensional (xy) raw data information by the image sensor 20.

The correcting part 42 performs shading correction or the like on the raw data according to need and acquires imaging information.

The correlation distance processing part 43 confirms pixel-to-pixel correlations of the corrected imaging information. The correlation distance processing part 43 also has a function of correlating areas.

The correlation distance processing part 43 has a function of obtaining points at which the correlation becomes the maximum respectively in the two-dimensional information and the distance to the object.

The computation processing part 44 has a function of creating image information from a preset matrix or an inverse matrix to a created matrix and creating individual images based on the image information.

The computation processing part 44 has a function of adding the obtained individual images of the optical systems and calculating an image obtained using the optical-multiplex system.

The image information obtained here is correlated with the images initially obtained by imaging in the correlation distance processing part 43, and a series of computation processing etc. are performed at a specified number of times until the correlation becomes nearly 100%, for example.

The optical-multiplex system imaging apparatus 10 including the signal processing unit 40 containing the above described functional blocks has a function of calculating focus and defocus images in response to the distance to the object. That is, the computation processing part 44 has a function of creating at least one of the defocused image and the focused image in response to the distance to the object OBJ.

The optical-multiplex system imaging apparatus 10 has a function of calculating data correlated with the distance to the object OBJ.

The optical-multiplex system imaging apparatus 10 has a function of calculating data correlated with parallax in response to the distance to the object OBJ.

The optical-multiplex system imaging apparatus 10 has a function of creating images correlated with parallax based on data in response to the distance to the object OBJ.

The optical-multiplex system imaging apparatus 10 has a function of creating images correlated with view point differences between not only right and left but also up and down in response to the distance to the object OBJ.

Here, an example of basic processing in the signal processing unit 40 having the above described functional blocks and an example of a finite distance object information calculation algorithm will be explained.

More specific plural processing will be described in detail later with reference to the drawings.

Example of Basic Processing a. Prepare an inverse function (inverse matrix (parallax correction matrix)) in response to the distance from the optical system to the object OBJ.
b. Calculate an image in response to the distance. For example, obtain an image in response to the distance by multiplying a main image by the inverse function.
c. Calculate a difference between reference data and itself. As the reference data, as described above, only the image with respect to the center optical system is acquired, or imaging information is acquired as reference information by the optical-multiplex system.
d. Correlate the distance value with the respective pixel information by the correlation of the amount of difference.
e. Calculate a desired image by performing image processing in response to the distance.

Example of Finite Distance Object Information Calculation Algorithm a. Perform difference detection between plural information obtained by computing plural two-dimensional (xy) raw data information in response to a distance (z) to the object OBJ using position information and shading information of the optical-multiplex system and the reference information.
b. Calculate a difference between image data calculated using the matrix for correction of parallax and the reference data at the distance z to the object OBJ and confirm the correlation thereof.
c. Also confirm the correlation with respect to each pixel and the correlation with respect to each area. Calculate information of local space correlation, overall correlation, or the like. Calculate the difference between the information of the computation result and the reference data, there are parts in which the difference is the local minimum and parts in which the difference is left.
d. Obtain points at which the difference is the local minimum, i.e., the correlation is the maximum in the two-dimensional (xy) information and the distance (z) to the object, respectively.
e. Connect the points at which the correlation is the maximum in the three-dimensional space of xyz and obtain a focused image.
f. The minimum parts are images without parallax. Their distances are determined by the distance information of the matrix in use.
g. Regarding the degree of the local minimum, determine it by the degree of correlation of the spatial distribution of the number of optical-multiplex systems.
h. Correlate distance information in units of pixels and with respect to each area.
i. Perform pixel addition for defocus and perform desired image synthesis of position conversion based on the parallax information.

Here, an algorithm in the optical-multiplex system imaging apparatus 10 according to the simulation model in FIG. 2 is shown.

The following equations relatively express the algorithm in the optical-multiplex system imaging apparatus 10.

$$S_{ij} = \sum_{k=1}^{N} \sum_{l=1}^{M} a_{ijkl} B_{kl} \qquad \text{Equation (1)}$$

$$B_{ij} = \sum_{k=1}^{N} \sum_{l=1}^{M} b_{ijkl} S_{kl} \qquad \text{Equation (2)}$$

$S_{ij}$: The signal quantity of the address $(i, j)$ in pixels $a_{ijkl}$: The coefficient $B_{kl}$: The object information $b_{ijkl}$: The coefficient $N$: The number of vertical pixels $M$: The number of horizontal pixels Sij indicates imaging information (signal component) in the pixel at coordinates (i,j), aijkl indicates a coefficient with respect to a matrix, Bij indicates object information, bijkl indicates a coefficient with respect to an inverse matrix, N indicates the number of pixels in the vertical direction, and M indicates the number of pixels in the horizontal direction, respectively.

The relationship between the information Blk of the object at a distance approximated at the point at infinity and the imaging information Sij is correlated by one coefficient aijkl as follows.

$$S_{ij} = \sum_{k=1}^{N} \sum_{l=1}^{M} a_{ijkl} B_{kl}$$

The relationship between the information Blkd of the object at a finite distance and the imaging information Sij is correlated by one coefficient aijkld as follows.

$$S_{ij} = \sum_{d=1}^{Ld} \sum_{k=1}^{N} \sum_{l=1}^{M} a_{ijkld} B_{kld}$$

$$S_{ij} = \sum_{d=1}^{Ld} \sum_{k=1}^{N} \sum_{l=1}^{M} a_{ijkld} B_{kld} = \sum_{k=1}^{N} \sum_{l=1}^{M} a_{ijklLd} B_{klLd} + \sum_{d=1}^{Ld-1} a_{ijkld} B_{kld}$$

$$\sum_{k=1}^{N} \sum_{l=1}^{M} a_{ijklLd} B_{klLd} = S_{ij} - \sum_{d=1}^{Ld-1} a_{ijkld} B_{kld}$$

$$B_{ij} = \sum_{k=1}^{N} \sum_{l=1}^{M} b_{ijkl} S_{kl} - \sum_{d=1}^{Ld-1} \sum_{k=1}^{N} \sum_{l=1}^{M} c_{ijkld} B_{kld}$$

-continued $$S_{ijd} = B_{ij} - \sum_{k=1}^{N}\sum_{l=1}^{M} b_{ijkl} S_{kl} =$$

$$\sum_{d=1}^{Ld-1}\sum_{k=1}^{N}\sum_{l=1}^{M} c_{ijkld} B_{kl} = \sum_{k=1}^{N}\sum_{l=1}^{M} c_{ijkl(Ld-1)} B_{kl(Ld-1)} + \sum_{d=1}^{Ld-2} c_{ijkld} B_{kl}$$

The above description is on the assumption of the optical-multiplex system imaging apparatus 10 under the precondition that there are focus and parallax.

<3. Specific Examples of Signal Processing>

As above, the outline of the signal processing in the signal processing unit 40 of the optical-multiplex system imaging apparatus 10 according to the embodiment has been explained.

As below, an operation of the optical-multiplex system imaging apparatus 10 will be explained by showing plural specific examples while centering finite distance object information calculation processing in the signal processing unit 40.

First Example of Finite Distance Object Information Calculation Processing

Figure 4:
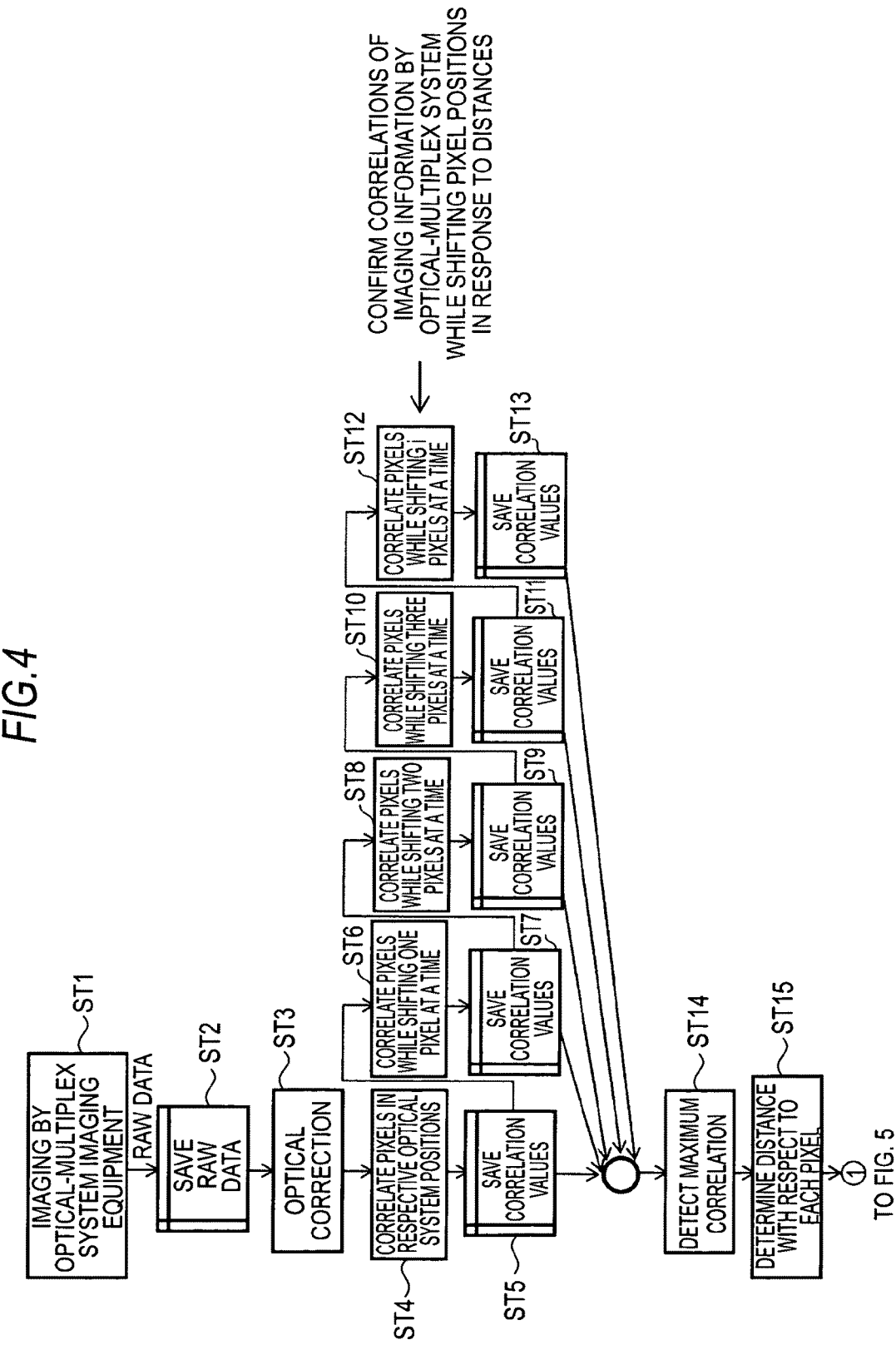
FIG. 4 is the first diagram showing a flowchart for explanation of first finite distance object information calculation processing of the optical-multiplex system imaging apparatus according to the embodiment.

FIG. 4 is the first diagram showing the flowchart for explanation of first finite distance object information calculation processing of the optical-multiplex system imaging apparatus according to the embodiment.

Figure 5:
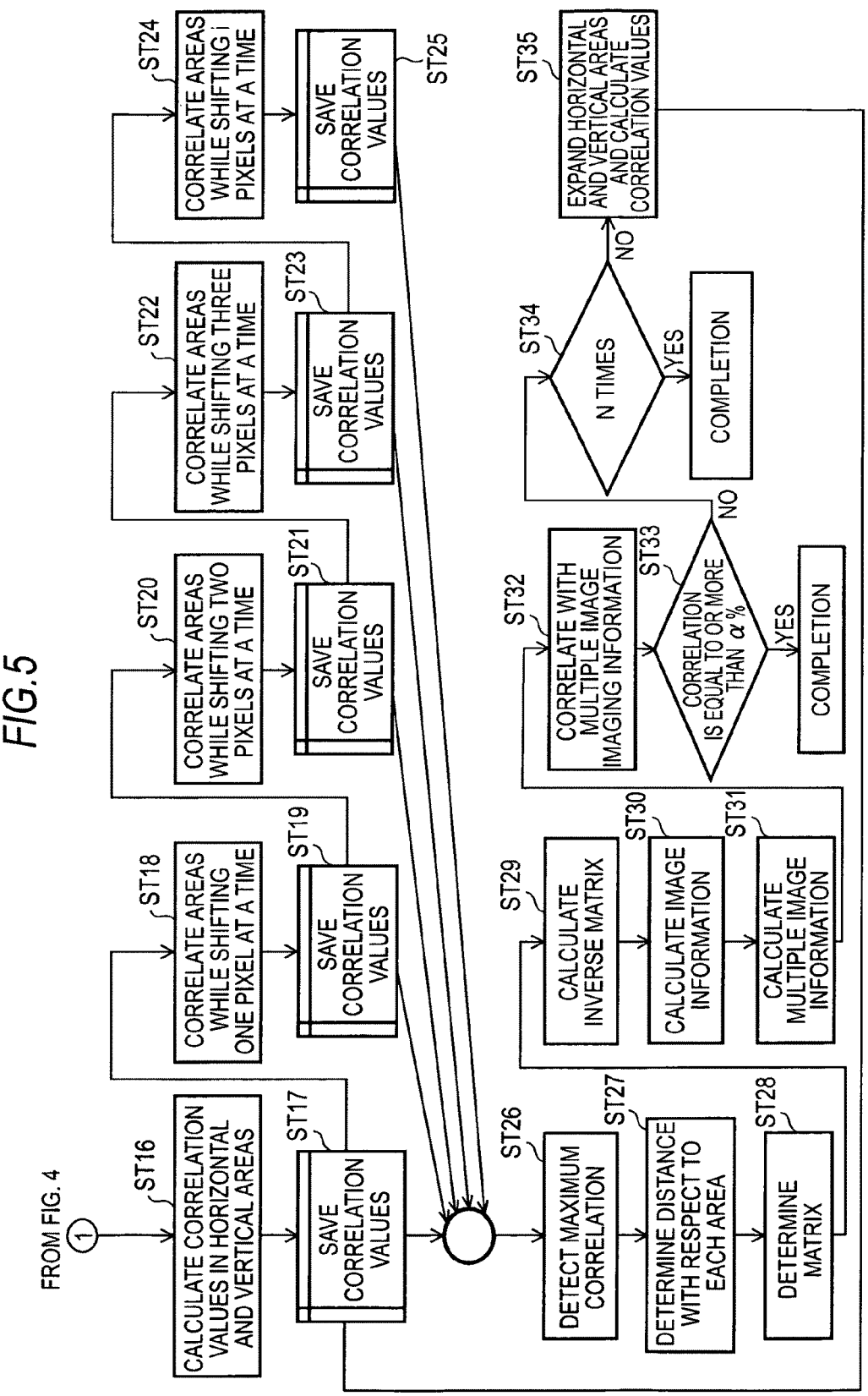
FIG. 5 is the second diagram showing the flowchart for explanation of the first finite distance object information calculation processing of the optical-multiplex system imaging apparatus according to the embodiment.

FIG. 5 is the second diagram showing a flowchart for explanation of the first finite distance object information calculation processing of the optical-multiplex system imaging apparatus according to the embodiment.

The first example is an example of employing a method of selecting elements of a matrix from correlations based on the positions of the respective optical systems of the optical-multiplex system with respect to pixels and pixel areas, and the case where they are obtained from only one piece of imaging information by the optical-multiplex system.

First, by the optical-multiplex system imaging apparatus 10, the object OBJ is imaged using the image sensor 20 through the respective optical systems 32C, 32U, 32B, 32R, 32L of the light guiding unit 30 (ST1), and their raw data are supplied to the signal processing unit 40. The signal processing unit 40 saves the input raw data in the saving part (ST2).

The signal processing unit 40 performs shading correction based on the positions of the respective optical systems 32C, 32U, 32B, 32R, 32L of the optical-multiplex system imaging apparatus 10 (ST3), and calculates correlations between pixels of the corrected imaging information (ST4 to ST15).

In this case, pixel correlations are calculated to i pixel while shifting the pixel one by one and their correlation values are saved, and the distance with respect to each pixel is determined by detecting the maximum value of correlation.

Note that i is a numeric value representing the amount of shift of the pixels derived from parallax, for example. In this example, i takes an integer value. According to need, i takes a numeric value corresponding to the difference between positions of the respective optical systems, the number of horizontal pixels, the number of vertical pixels, or the like.

In a pixel area with a low correlation, an area correlation with the position of the optical-multiplex system is calculated (ST16 to ST27).

In this case, correlation values in horizontal and vertical areas are calculated, pixel correlations are calculated to the i pixel while shifting pixels one by one and their correlation values are saved, and the distance with respect to each pixel is determined by detecting the maximum value of correlation. In this regard, the position of the area by the center optical system is selected depending on the strength of the area correlation.

Then, the elements of the matrix in response to the distance are selected according to the degree of pixel correlation (ST28).

In the pixel area with a low correlation, an area correlation with the position of the optical-multiplex system is calculated.

The areas by the peripheral optical systems 32U, 32B, 32R, 32L not the center optical system 32C are set as the peripheral elements of the matrix.

In the pixel area with a low correlation, elements corresponding to the finite distance in the direction in which the pixel correlation becomes higher are set.

Then, the matrix is created (ST28), and an inverse matrix is obtained (ST29).

Image information is created from the imaged images and the inverse matrix (ST30).

On the basis of the created image information, first, images of the individual optical systems in the optical-multiplex system are created using the position of the optical-multiplex system and the shading characteristics or the like.

The obtained images of the individual optical systems 32C, 32U, 32B, 32R, 32L are added, and an image obtained using the optical-multiplex system is calculated (ST31).

A correlation between the image information obtained here and the images initially obtained by imaging is calculated (ST32).

Here, if the correlation is equal to or more than a predetermined threshold value α % (ST33), the processing is completed.

If the number of repetitions is equal to or more than a specified number (ST34), the processing is ended.

If the number of repetitions is less than the specified number (ST34), the horizontal and vertical areas are expanded and correlation values are calculated (ST35), and, returning to the processing at step ST17, and the processing is repeated.

Second Example of Finite Distance Object Information Calculation Processing

Figure 6:
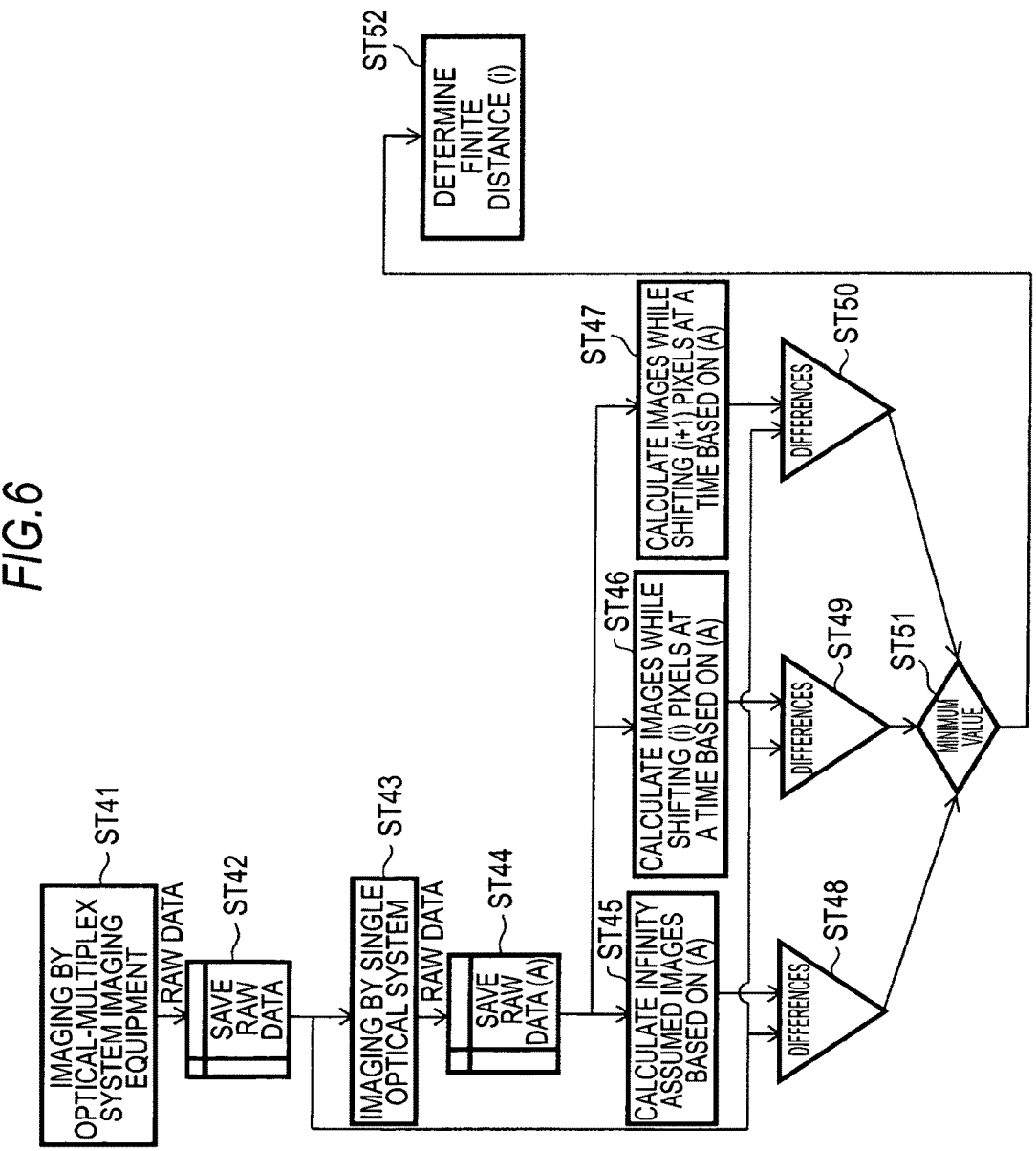
FIG. 6 shows a flowchart for explanation of second finite distance object information calculation processing of the optical-multiplex system imaging apparatus according to the embodiment.

FIG. 6 shows a flowchart for explanation of second finite distance object information calculation processing of the optical-multiplex system imaging apparatus according to the embodiment.

The second example is an example of employing a method of selecting elements of a matrix from correlations based on the positions of the respective optical systems of the optical-multiplex system with respect to pixels and pixel areas, and the case where they are obtained by acquiring also the imaging information by the center optical system 32C forming the optical-multiplex system.

The calculation is performed by acquiring also the imaging information by the center optical system 32C, and the calculation time is shorter than that in the first example.

First, by the optical-multiplex system imaging apparatus 10, the object OBJ is imaged using the image sensor 20 through the respective optical systems 32C, 32U, 32B, 32R, 32L of the light guiding unit 30 (ST41), and their raw data are supplied to the signal processing unit 40. The signal processing unit 40 saves the input raw data in the saving part (ST42).

Imaging is performed by the image sensor 20 through the center optical system 32C of the light guiding unit 30 (ST43), and the raw data is supplied to the signal processing unit 40. The signal processing unit 40 saves the input raw data in the saving part (ST44).

On the basis of the optical information of the respective optical systems 32C, 32U, 32B, 32R, 32L of the optical-multiplex system and the imaging information by the center optical system 32C acquired at step ST43, image processing is calculated using the distance information to the object as parameters.

The signal processing unit 40 calculates image information equivalent to the imaging information by the plural optical systems acquired at step ST41 with respect to the positions of the respective optical systems 32 (C to L) and the shading characteristics of the respective optical systems using the distance information to the object as parameters (ST45 to ST47).

In this case, infinity assumed information is calculated based on the imaging information by the center optical system 32C. Then, on the basis of the imaging information by the center optical system 32C, image information to (i+1) pixel is calculated while shifting i pixels at a time.

Correlations between the obtained image information and the imaging information acquired at step ST41 are calculated using the distance information to the object OBJ as parameters (ST48 to ST50).

The position where the difference is the minimum, i.e., the position where the correlation is the maximum is at the distance to the object in the object information of the respective pixels (ST51, ST52).

On the basis of the three kinds of information of the positions of the respective optical systems, the shading characteristics of the respective optical systems, and the distance information of the respective pixels and the acquired imaging information by the center optical system, image information equivalent to the imaging information by the plural optical systems acquired at step ST41.

Subsequently, the same processing as that in the first example is performed (see FIG. 5).

Correlations between the image information obtained here and the imaging information acquired at the step ST41 are calculated.

It is confirmed that the correlations are sufficiently great in all pixels, and obtainment of the coefficient (matrix) based on the distance information is determined.

Then, an inverse matrix is obtained.

Image information is created from the imaging information and the inverse matrix.

On the basis of the calculated image information, first, images of the individual optical systems in the optical-multiplex system are created using the position of the optical-multiplex system and the shading characteristics or the like.

The obtained images of the individual optical systems are added, and an image obtained using the optical-multiplex system is calculated.

A correlation between the image information obtained here and the images initially obtained by imaging is calculated.

Here, if the correlation is nearly 100%, the processing is completed.

If the number of repetitions is equal to or more than a specified number, the processing is ended.

If the number of repetitions is less than the specified number, returning to the processing at steps ST51, ST52, and the subsequent processing is repeated.

Third Example of Finite Distance Object Information Calculation Processing

Figure 7:
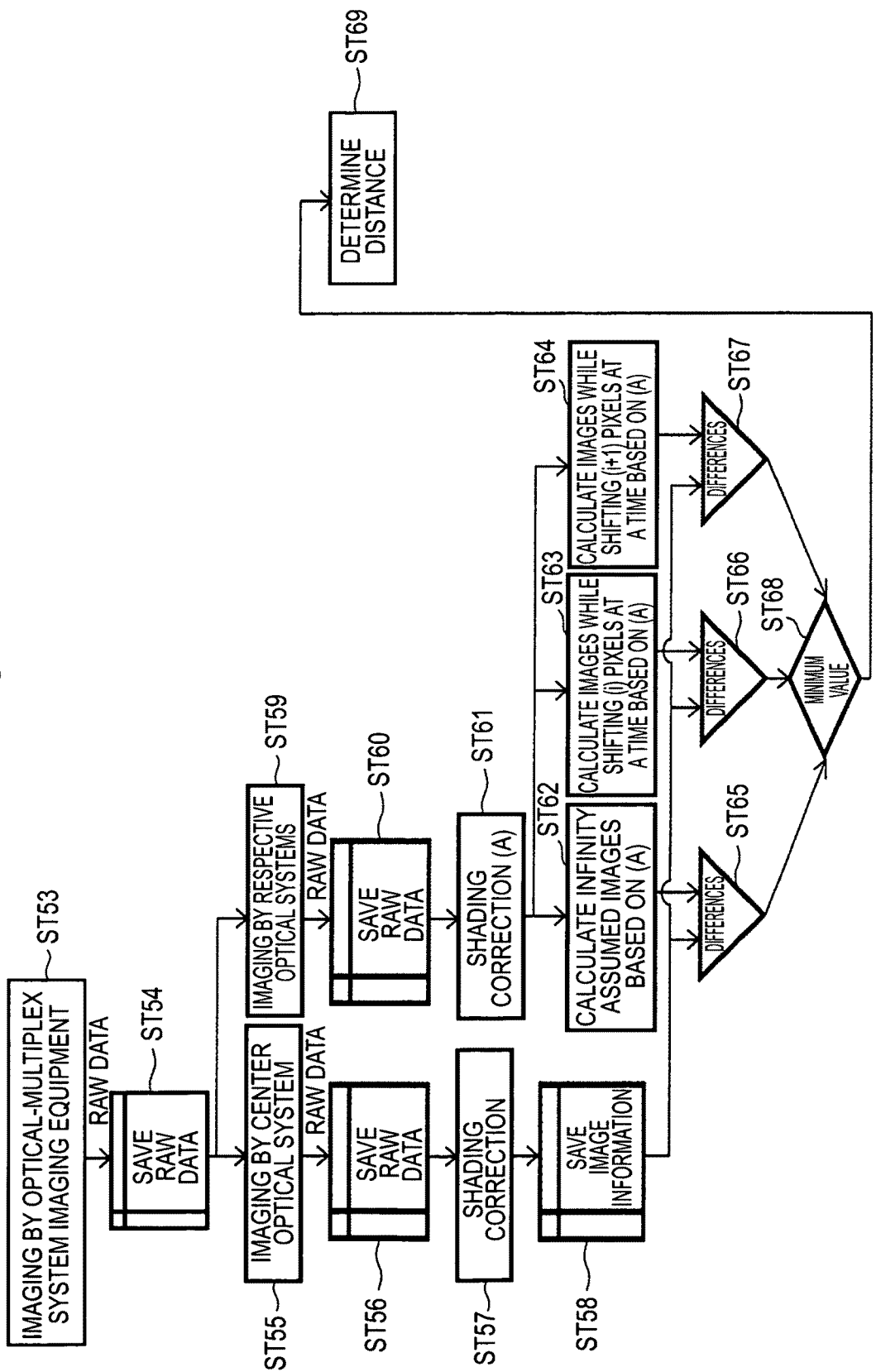
FIG. 7 shows a flowchart for explanation of third finite distance object information calculation processing of the optical-multiplex system imaging apparatus according to the embodiment.

FIG. 7 shows a flowchart for explanation of third finite distance object information calculation processing of the optical-multiplex system imaging apparatus according to the embodiment.

The third example is an example of employing a method of selecting elements of a matrix from correlations based on the positions of the respective optical systems of the optical-multiplex system with respect to pixels and pixel areas, and the case where they are obtained by acquiring also the imaging information by the plural optical systems 32 (C to L) forming the optical-multiplex system.

The calculation is performed by acquiring also the imaging information by the plural optical systems 32 (C to L), the calculation time is shorter than those in the first example and the second example.

First, by the optical-multiplex system imaging apparatus 10, the object OBJ is imaged using the image sensor 20 through the respective optical systems 32C, 32U, 32B, 32R, 32L of the light guiding unit 30 (ST53), and their raw data are supplied to the signal processing unit 40. The signal processing unit 40 saves the input raw data in the saving part (ST54).

Imaging is performed by the image sensor 20 through the center optical system 32C of the light guiding unit 30 (ST55), and the raw data is supplied to the signal processing unit 40. The signal processing unit 40 saves the input raw data in the saving part (ST56).

The signal processing unit 40 performs shading correction on the imaging information by the center optical system 32C (ST57), and saves the image information (ST58).

Imaging is performed by the image sensor 20 through the respective optical systems 32C, 32U, 32B, 32R, 32L of the light guiding unit 30 (ST59), and the raw data are supplied to the signal processing unit 40. The signal processing unit 40 saves the input raw data in the saving part (ST60).

The signal processing unit 40 respectively calculates the shading-corrected image information based on the respective imaging information of the plural optical systems (ST61).

On the basis of the image information of the respective optical systems acquired at step ST59, image information of the respective optical systems 32C, 32U, 32B, 32R, 32L is calculated using the distance information to the object as parameters (ST62 to ST64).

In this case, infinity assumed information is calculated based on the imaging information at step ST61. Then, on the basis of the imaging information by the center optical system 32C, image information to (i+1) pixel is calculated while shifting i pixels at a time.

Correlations between the obtained image information and the imaging information of the center optical system 32C acquired at step ST57 are calculated using the distance information to the object OBJ as parameters (ST65 to ST67).

The position where the difference is the minimum, i.e., the position where the correlation is the maximum is at the distance to the object in the object information of the respective pixels (ST68, ST69).

Subsequently, the same processing as those in the first example and the second example is performed (see FIG. 5).

A matrix is obtained based on the distance information in response to the respective pixels.

Then, an inverse matrix is obtained.

Image information is created from the imaging information and the inverse matrix.

On the basis of the calculated image information, first, images of the individual optical systems in the optical-multiplex system are created using the position of the optical-multiplex system and the shading characteristics or the like.

The obtained images of the individual optical systems are added, and an image obtained using the optical-multiplex system is calculated.

A correlation between the image information obtained here and the images initially obtained by imaging is calculated.

Here, if the correlation is nearly 100%, the processing is completed.

If the number of repetitions is equal to or more than a specified number, the processing is ended.

If the number of repetitions is less than the specified number, returning to the processing at steps ST68, ST69, and the subsequent processing is repeated.

Fourth Example of Finite Distance Object Information Calculation Processing

Figure 8:
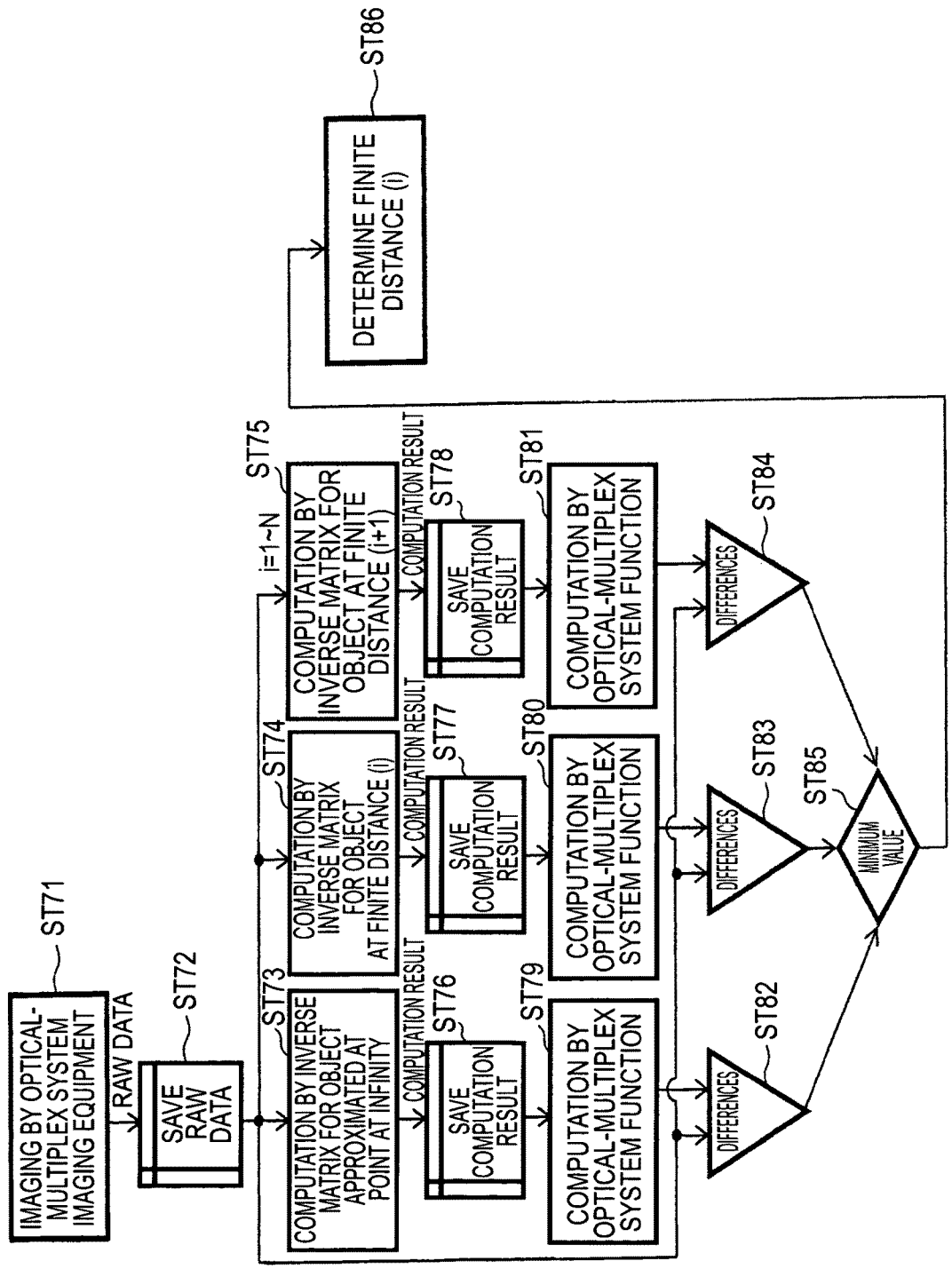
FIG. 8 shows a flowchart for explanation of fourth finite distance object information calculation processing of the optical-multiplex system imaging apparatus according to the embodiment.

FIG. 8 shows a flowchart for explanation of fourth finite distance object information calculation processing of the optical-multiplex system imaging apparatus according to the embodiment.

The fourth example is the case of employing a method of preparing plural matrices in response to distances in advance and selecting elements of a matrix from correlations between images calculated using the matrices and a reference image.

That is, processing including the following basic processing shown as an example of the basic processing is performed.
a. Prepare an inverse function (inverse matrix (parallax correction matrix)) in response to the distance from the optical system to the object OBJ.
b. Calculate an image in response to the distance. For example, obtain an image in response to the distance by multiplying a main image by the inverse function.
c. Calculate a difference between reference data and itself. As the reference data, as described above, only the image with respect to the center optical system is acquired, or imaging information is acquired as reference information by the optical-multiplex system.
d. Correlate the distance value with the respective image information by the correlation of the amount of difference.
e. Calculate a desired image by performing image processing in response to the distance.

In the fourth example, as the reference data, imaging information (raw data) is acquired as reference information by the optical-multiplex system.

The fourth example is simple in the idea and easy to understand, however, it takes a lot of calculation time because it performs calculation of all pixels and all distances.

First, by the optical-multiplex system imaging apparatus 10, the object OBJ is imaged using the image sensor 20 through the respective optical systems 32C, 32U, 32B, 32R, 32L of the light guiding unit 30 (ST71), and their raw data are supplied to the signal processing unit 40. The signal processing unit 40 saves the input raw data in the saving part (ST72).

Images in response to distances are calculated. Images in response to distances are obtained by multiplying a main image by inverse matrices (ST73 to ST75), and those computation results are saved (ST76 to ST78).

In this case, on the basis of the imaging information at step ST72, computation is performed on an inverse matrix for object approximated at point at infinity and saved (ST73, ST76).

On the basis of the imaging information at step ST72, computation is performed on an inverse matrix for object at finite distance (i) and saved (ST74, ST77).

On the basis of the imaging information at step ST72, computation is performed on an inverse matrix for object at finite distance (i+1) and saved (ST75, ST78).

Then, on the basis of the respective computation results, computation by an optical-multiplex system function is performed (ST79 to ST81).

Differences from the computation results at steps ST79 to ST81 are calculated using the imaging information (raw data) by the optical-multiplex system as reference information (ST82 to ST84).

The position where the difference is the minimum, i.e., the position where the correlation is the maximum is at the distance to the object in the object information of the respective pixels (ST85, ST86).

Subsequently, the same processing as that in the first example, the second example, and the third example is performed.

Fifth Example of Finite Distance Object Information Calculation Processing

Figure 9:
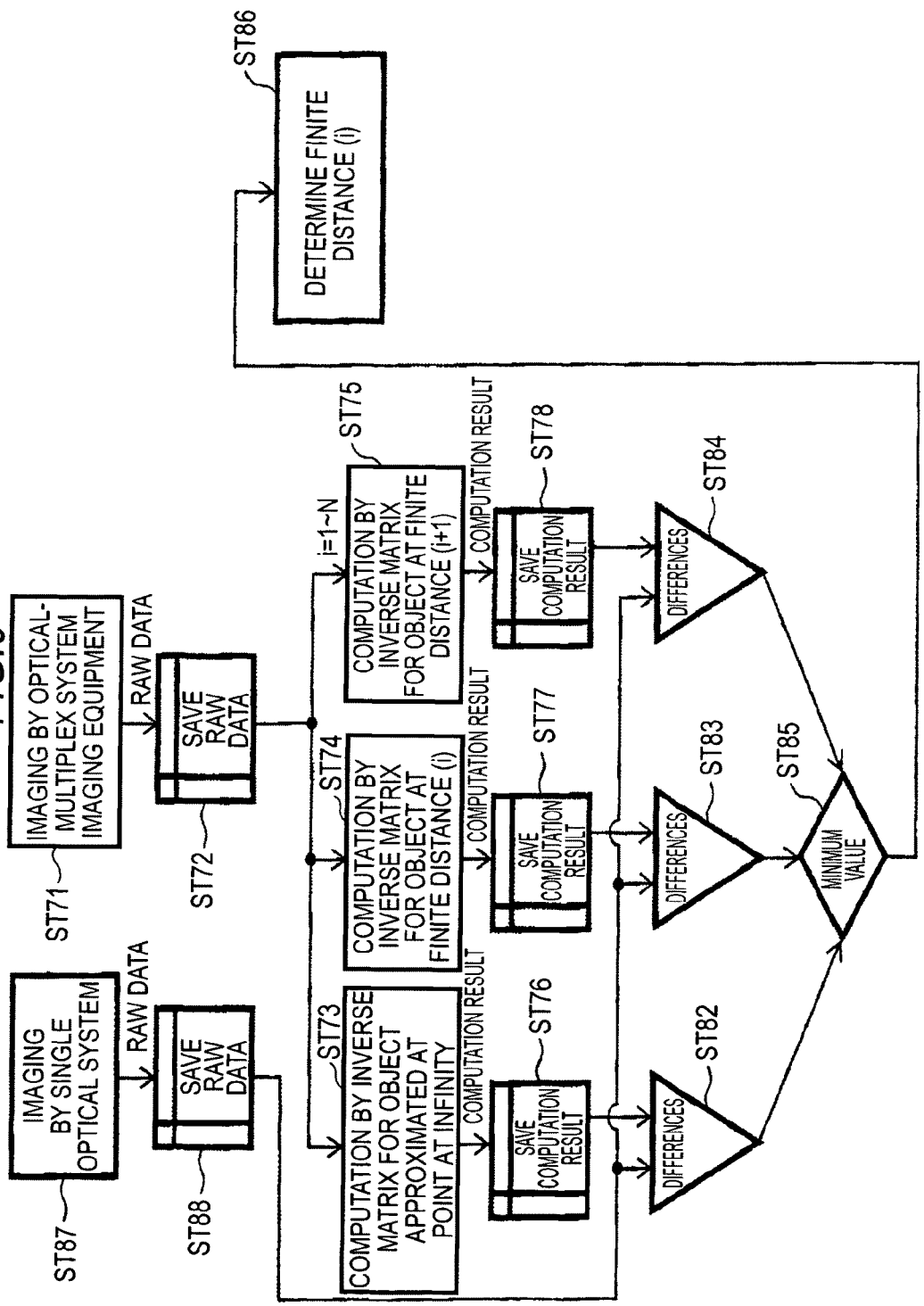
FIG. 9 shows a flowchart for explanation of fifth finite distance object information calculation processing of the optical-multiplex system imaging apparatus according to the embodiment.

FIG. 9 shows a flowchart for explanation of fifth finite distance object information calculation processing of the optical-multiplex system imaging apparatus according to the embodiment.

The fifth example is the case of employing a method of preparing plural matrices in response to distances in advance and selecting elements of a matrix from correlations between images calculated using the matrices and a reference image.

The difference from the fourth example is that, as the reference data, only the center optical system 32C is acquired and the processing at steps ST79 to ST81 is omitted.

The fifth example is simple in the idea and easy to understand, and it takes the shorter calculation time than that of the fourth example because it acquires the image of the center optical system 32C as the reference data.

That is, at steps in FIG. 8, the object is imaged using the image sensor 20 through the center optical system 32C of the light guiding unit 30 (ST87), and the raw data is supplied to the signal processing unit 40. The signal processing unit 40 saves the input raw data in the saving part (ST88).

Then, differences from the computation results at steps ST79 to ST81 are calculated using the imaging information (raw data) of the center optical system 32C as reference information (ST82 to ST84).

The position where the difference is the minimum, i.e., the position where the correlation is the maximum is at the distance to the object in the object information of the respective pixels (ST85, ST86).

Subsequently, the same processing as that in the first example, the second example, and the third example is performed.

Here, examples of images obtained by the processing results of the signal processing unit 40 that performs the signal processing are shown in FIGS. 10 to 17.

Figure 10:
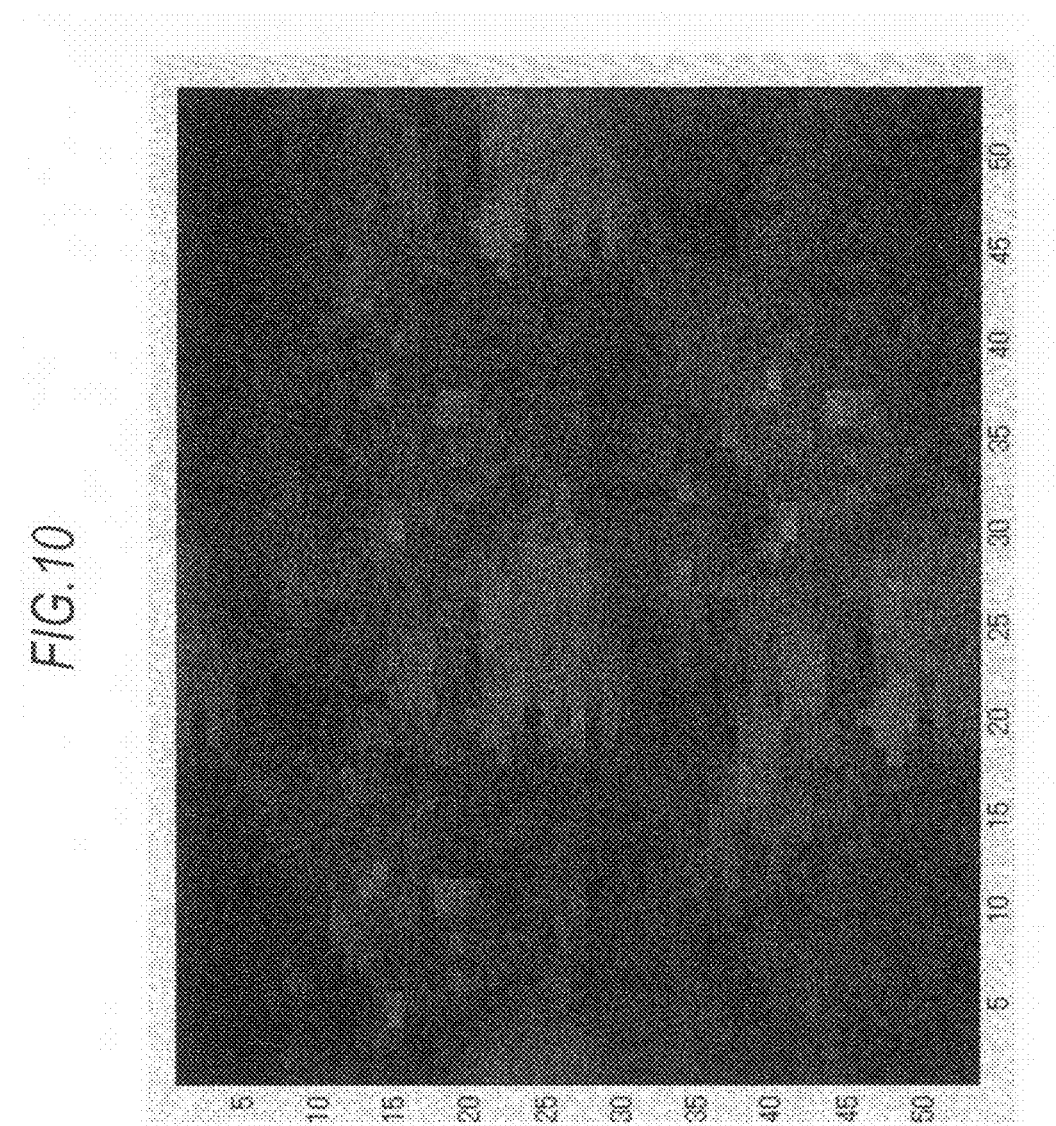
FIG. 10 shows an imaged image of output raw data by an image sensor through optical systems as five pinholes.

FIG. 10 shows an imaged image of output raw data by the image sensor 20 through optical systems 32C, 32U, 32B, 32R, 32L as five pinholes.

Figure 11:
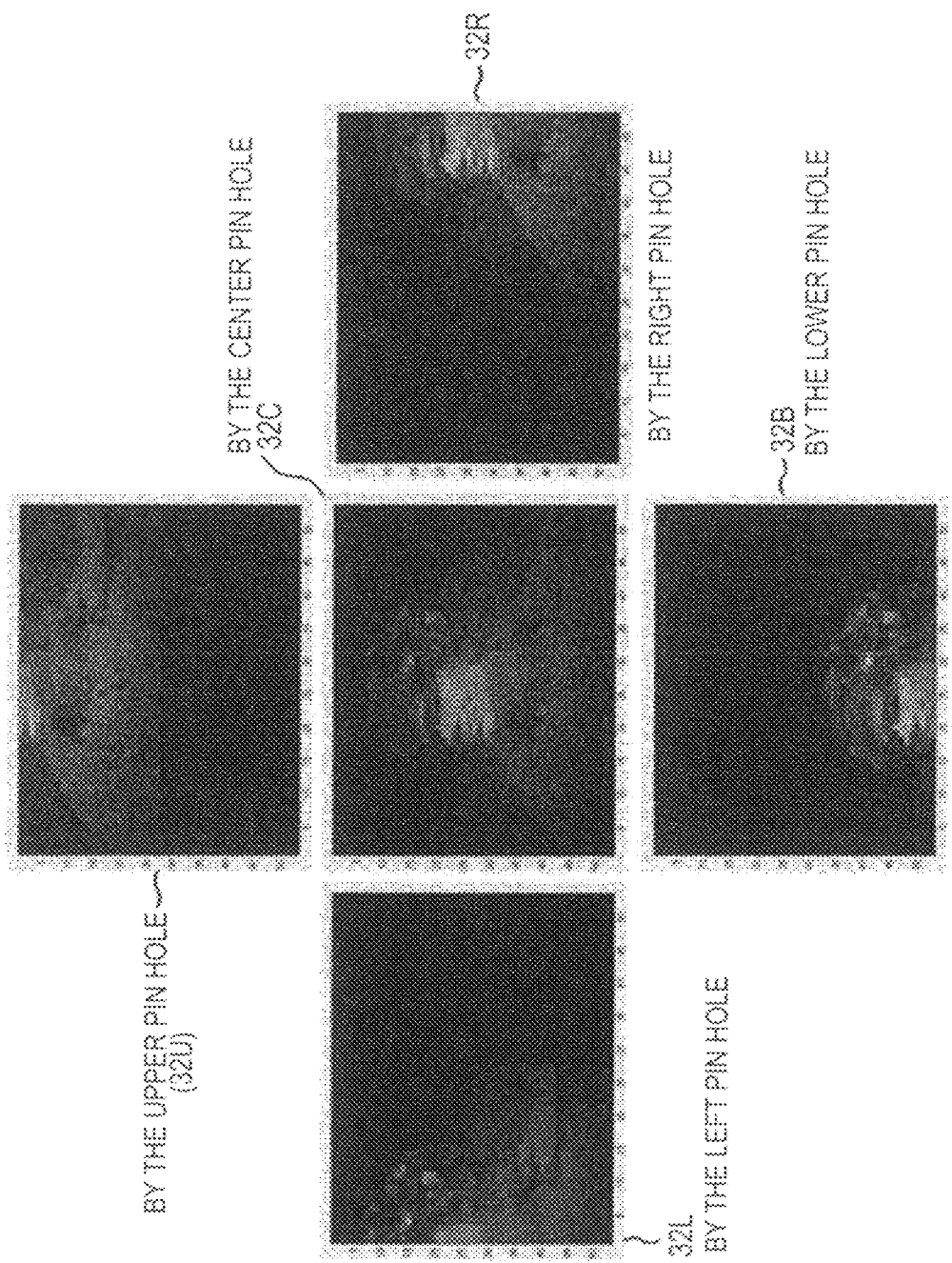
FIG. 11 shows respective imaged images of output raw data by the image sensor through the optical systems as five pinholes.

FIG. 11 shows respective imaged images of output raw data by the image sensor 20 through optical systems 32C, 32U, 32B, 32R, 32L as five pinholes.

Figure 12:
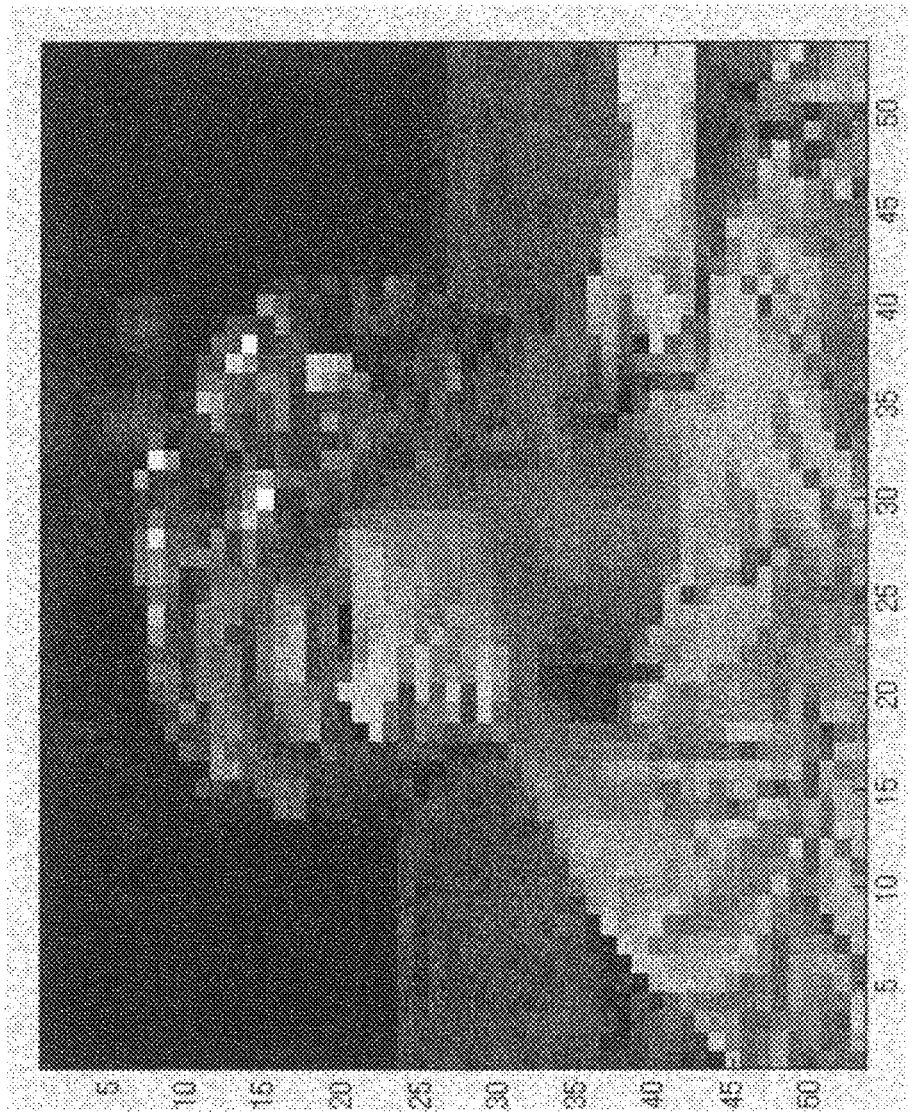
FIG. 12 shows images of output raw data after signal processing by the image sensor through the optical systems as five pinholes.

FIG. 12 shows images of output raw data after signal processing by the image sensor 20 through optical systems 32C, 32U, 32B, 32R, 32L.

As below, imaged images in the respective optical systems in the case where an object at infinity or approximated at infinity and an object at a finite distance are mixed are shown.

The following images are obtained by approximating the distance between the object OBJ and the aperture sheet 31 at the point at infinity (5.4 cm or more). Further, the distance between the aperture sheet 31 and the imaging surface is 200 μm, the distance between the optical system windows on the aperture sheet 31 is 270 μm, and the pixel pitch is 10 μm.

Figure 13:
FIG. 13 shows an object image by a center optical system.

FIG. 13 shows an object image by the center optical system 32C.

Figure 14:
FIG. 14 shows an object image by a right optical system in a positional relationship erecting toward both the imaging apparatus and the object.

FIG. 14 shows an object image by the right optical system 32R in a positional relationship erecting toward both the imaging apparatus 10 and the object.

Figure 15:
FIG. 15 shows an object image by a left optical system in the positional relationship erecting toward both the imaging apparatus and the object.

FIG. 15 shows an object image by the left optical system 32L in the positional relationship erecting toward both the imaging apparatus 10 and the object.

Figure 16:
FIG. 16 shows an object image by an upper optical system in the positional relationship erecting toward both the imaging apparatus and the object.

FIG. 16 shows an object image by the upper optical system 32U in the positional relationship erecting toward both the imaging apparatus 10 and the object.

FIG. 17 shows an object image by the lower optical system 32B in the positional relationship erecting toward both the imaging apparatus 10 and the object.

As described above, according to the optical-multiplex system imaging apparatus according to the embodiment, the following advantages may be obtained.

That is, the imaging apparatus according to the embodiment of calculating distance information between the imaging apparatus and the object using the optical-multiplex system is of the passive-type, and accordingly, needs no irradiation device of near-infrared light or the like for irradiating the object from the imaging apparatus side necessary for the active-type.

As a result, downsizing and lower cost of the entire imaging apparatus may be realized.

Since the distance information may be calculated if the light from the object enters the imaging apparatus and is received there, distances from short distance to infinity may be calculated.

Further, the imaging apparatus according to the embodiment may solve the following problems compared to the passive-type imaging apparatus.

First, regarding the upsizing and the higher cost problematic in the apparatus and system of calculating the distance information using plural cameras, since the distance information may be calculated by a single optical-multiplex system imaging apparatus in the embodiment, the entire apparatus becomes smaller and the cost becomes lower.

In addition, only a single optical-multiplex system imaging apparatus may be necessary, variations become smaller and specifications for the variations necessary for the imaging apparatus may be less restricted. The signal processing for correcting the variations is not relatively complex, and, as a result, the cost becomes lower.

Regarding the point that the resolution is not be taken higher problematic in the apparatus and system of calculating the distance information using a compound-eye imaging unit, in the embodiment, it is not necessary to reduce the number of pixels assigned to the main lens that dominates the resolution.

Therefore, the distance information calculation apparatus using the optical-multiplex system imaging apparatus may realize high resolution.

Regarding the lower resolution and the necessity of taking the aperture of the main lens larger problematic in the apparatus and system of calculating the distance information using a microlens array, in the embodiment, it is not necessary to reduce the number of pixels assigned to the main lens that dominates the resolution.

Therefore, the distance information calculation apparatus using the optical-multiplex system imaging apparatus may realize high resolution, and, since the accuracy of the distance information may be raised by taking the distance of the optical-multiplex system larger, it is not necessary to use the main lens having a large aperture and downsizing and the lower cost of the main lens may be realized.

Regarding the necessity of taking the aperture of the main lens larger problematic in the apparatus and system of calculating the distance information using a specially-processed lens, in the embodiment, the accuracy of the distance information may be raised by taking the distance of the optical-multiplex system larger.

Therefore, it is not necessary to use the main lens having a large aperture and downsizing and the lower cost of the main lens may be realized.

The present application contains subject matter related to that disclosed in Japanese Priority Patent Application JP 2009-288230 filed in the Japan Patent Office on Dec. 18, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an image sensor including a plurality of pixels, the plurality of pixels arranged in an array on an effective pixel area;
a light guiding unit including a plurality of optical system windows distributed across an optical system window formation area, the light guiding unit being configured to guide light from an imaged object to the plurality of pixels; and
a signal processing unit configured to perform signal processing on imaging information output by the image sensor, wherein
the signal processing unit calculates the imaging information iteratively by shifting an increasing number of pixels at each iteration and saves a respective correlation value at each iteration,
the signal processing unit accesses a plurality of predetermined matrices, wherein a matrix of the predetermined matrices contains a plurality of matrix elements, respective matrix elements being based on a correlation between the imaging information and a reference image data,
the signal processing unit determines distance information of the imaged object based on the matrix elements and generates an image based on the matrix elements and the imaging information, and
the signal processing unit generates a focused image of the imaged object and a defocused image of the imaged object based on the distance information.

2. The imaging apparatus according to claim 1, wherein the signal processing unit performs pixel addition for the defocused image.

3. The imaging apparatus according to claim 1, wherein
the plurality of optical system windows includes a center optical system window positioned in a center position of the optical system windows formation area and surrounding optical system windows positioned the optical system windows formation area at positions surrounding the center system window.

4. The imaging apparatus according to claim 3, wherein a diameter of center optical system window is larger than the diameters of the surrounding optical system windows.

5. The imaging apparatus according to claim 4, wherein the area of the optical system window formation area is at least nine times larger than the effective pixel area.

6. The imaging apparatus according to claim 3,
the signal processing unit further acquires imaging information of the center optical system window in addition to plural pieces of imaging information by the plural optical system windows and applies the imaging information of the center optical system window in addition to the plural pieces of imaging information by the plural optical system windows to create image information, or acquires also plural pieces of imaging information by the plural optical system windows in addition to imaging information of the center optical system window and applies the plural pieces of imaging information by the plural optical system windows in addition to imaging information of the center optical system window to create image information.

7. The imaging apparatus according to claim 1, wherein, in the case where an imaged scene includes at least an object at infinity or approximated to be at infinity and an object at a finite distance, the signal processing unit acquires image information of the imaged objects and calculates distance information to both the object at infinity or approximated to be at infinity and the object at the finite distance from the imaging information.

8. The imaging apparatus according to claim 1, wherein the signal processing unit determines the distance information by selecting the matrix elements from correlation based on formation positions of the respective optical system windows of the plural optical system windows with respect to pixels and pixel areas.

9. The imaging apparatus according to claim 8, wherein the signal processing unit applies one piece of imaging information from the plural optical system windows to create image information.

10. The imaging apparatus according to claim 8, wherein the signal processing unit creates image information from a function with respect to the matrix elements and the imaging information, creates images of the respective optical system windows based on the image information by application of position information of the respective optical system windows, and creates an image by adding the images of the respective optical system windows.

11. The imaging apparatus according to claim 10, wherein the signal processing unit correlates the image information obtained by addition and image information initially acquired and repeats processing at predetermined times until the correlation value becomes equal to or more than a specified value.

12. An imaging method comprising the steps of:
guiding light from an imaged object through a plurality of optical system windows distributed across an optical system window formation area to an image sensor including a plurality of pixels, the plurality of pixels arranged in an array on an effective pixel area;
performing signal processing based on imaging information from the image sensor, wherein,
in the step of signal processing, the imaging information is calculated iteratively by shifting an increasing number of pixels at each iteration and saving a respective correlation value at each iteration,
in the step of performing signal processing, a plurality of predetermined matrices are accessed, wherein a matrix of the predetermined matrices contains a plurality of matrix elements, respective matrix elements being based on a correlation between the imaging information and a reference image data,
in the step of performing signal processing, distance information of the object is determined based on the matrix elements and an image is generated based on the distance information matrix elements and the imaging information, and
in the step of performing signal processing, a focused image and a defocused image are generated based on the distance information.

13. The imaging method according to claim 12, wherein in the step of performing signal processing, pixel addition is performed for the defocused image.

14. The imaging method according to claim 12, wherein the plurality of optical system windows includes a center optical system window positioned in a center position of the optical system windows formation area and surrounding optical system windows positioned the optical system windows formation area at positions surrounding the center system window.

15. The imaging method according to claim 12, wherein a diameter of center optical system window is larger than the diameters of the surrounding optical system windows.

16. The imaging method according to claim 15, wherein the area of the optical system window formation area is at least nine times larger than the effective pixel area.

17. The imaging method according to claim 12, wherein, in the step of performing signal processing, in the case where the imaged objects include at least an object at infinity or approximated to be at infinity and an object at a finite distance, the signal processing step acquires image information of the object and calculates distance information to the object at infinity or approximated to be at infinity and the object at the finite distance from the imaging information.

18. The imaging method according to claim 12, wherein, in the step of performing signal processing, the distance information is determined by selecting the matrix elements from correlation based on formation positions of the respective optical system windows of the plural optical system windows with respect to pixels and pixel areas.

19. The imaging method according to claim 18, wherein, in the step of performing signal processing, one piece of imaging information is applied by the plural optical system windows to create image information.

20. The imaging method according to claim 18, wherein, in the step of performing signal processing, imaging information is acquired of the optical system window located at the center in addition to plural pieces of imaging information by the plural optical system windows and applies them to creation of image information, or plural pieces of imaging information are acquired by the plural optical system windows in addition to imaging information of the optical system window located at the center and applies them to creation of image information.

21. The imaging method according to claim 12, wherein, in the step of performing signal processing, image information is created from a function with respect to the matrix elements and the imaging information, images of the respective optical system windows are created based on the image information by application of position information of the respective optical system windows, and an image is created by adding the images of the respective optical system windows.

* * * * *